United States Patent [19]
> Hiersig et al.

[11] 3,813,897
[45] June 4, 1974

[54] RESILIENT SHAFT COUPLING FOR READY ASSEMBLY AND DISASSEMBLY

[75] Inventors: Heinz M. Hiersig, Dusseldorf-Oberkassel; Klaus Hansgen; Gerhard Ridder, both of Witten; Wolfgang Sudhoff, Dortmund-Mengede, all of Germany

[73] Assignee: Mannesmann-Meer Aktiengesellschaft, Monchengladbach, Germany

[22] Filed: May 3, 1973

[21] Appl. No.: 356,994

[30] Foreign Application Priority Data
May 17, 1972  Germany............................ 2225024

[52] U.S. Cl............................. 64/13, 64/14, 64/11, 64/27 NM
[51] Int. Cl.............................................. F16d 3/78
[58] Field of Search.... 64/12, 13, 14, 27 NM, 11 R, 64/6

[56] References Cited
UNITED STATES PATENTS

| 1,691,190 | 11/1928 | Hatfield | 64/13 |
| 2,871,683 | 2/1959 | Hallewell | 64/13 |
| 3,759,063 | 9/1973 | Bendall | 64/13 |

FOREIGN PATENTS OR APPLICATIONS

| 305,921 | 4/1929 | Great Britain | 64/13 |
| 874,483 | 8/1961 | Great Britain | 64/13 |

Primary Examiner—Samuel Scott
Assistant Examiner—Randall Heald
Attorney, Agent, or Firm—Ralf H. Siegemund

[57] ABSTRACT

A resilient coupling as between a hub and a flange is constructed for step-wise removal laterally (radially) from and through particular clearance space between the rotatable parts as interconnectable by the coupling.

6 Claims, 3 Drawing Figures

PATENTED JUN 4 1974  3,813,897
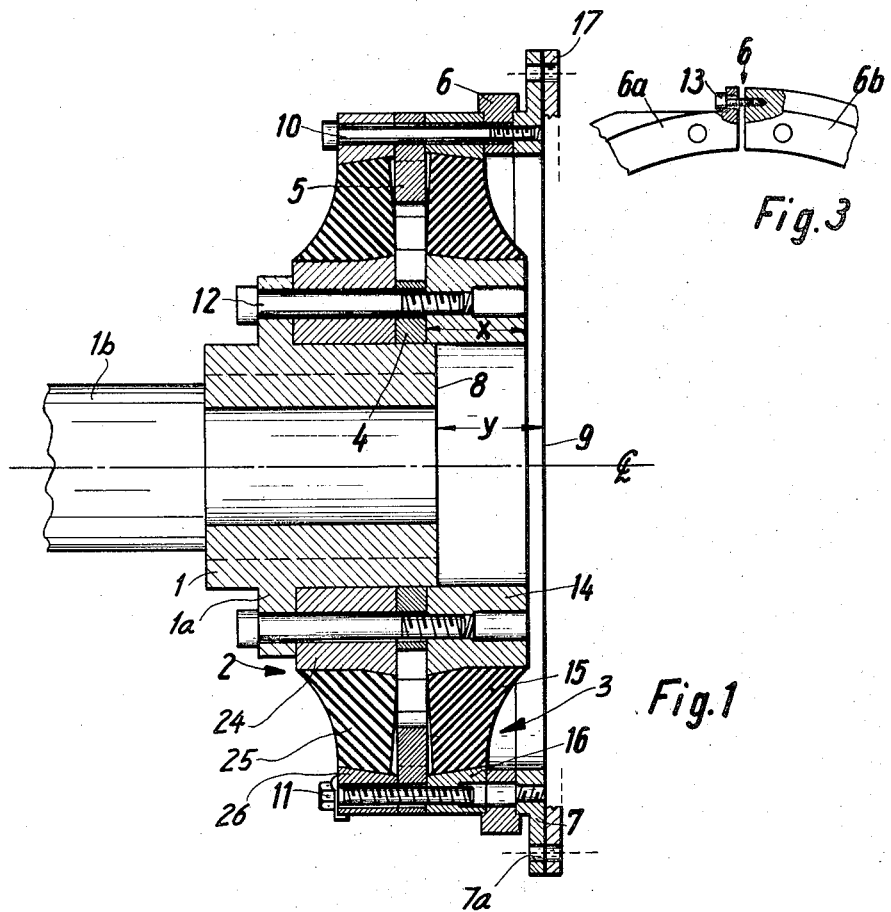
Fig.3
Fig.1
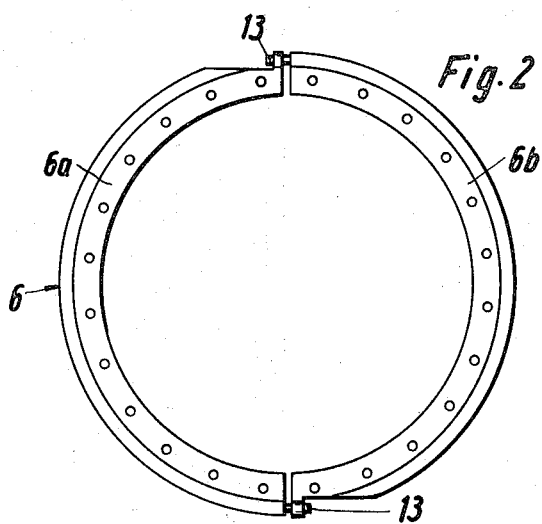
Fig.2

RESILIENT SHAFT COUPLING FOR READY ASSEMBLY AND DISASSEMBLY

BACKGROUND OF THE INVENTION

The present invention relates to a highly elastic shaft coupling, and more particularly to improvements in such couplings having radially removable components.

Couplings of this type may have a hub and a flange respectively connected to the rotating parts, and the coupling drivingly interconnects these parts. One or two annular elements are provided, each having a collar releasably secured to the hub, a rim connected to the flange, and resilient annul; or the like connecting the respective collar to the respective circumscribing rim. The axial dimensions of the several annular elements are slightly below the clearance space between the front face of the shaft hub and, for example, that axial face of the flange which faces away from the hub.

It is a specific object of the present invention to improve on the construction of a coupling of the aforementioned type to facilitate disassembling the coupling without having to interfere with the rotating parts which are interconnected by the coupling when installed.

SUMMARY OF THE INVENTION

In accordance with the present invention it is suggested to provide a biparted spacer ring between the one rim element and the flange, with releasable interconnection of the parts so that this spacer ring can be assembled and disassembled on location, and when removed, the annular elements can be axially shifted into the clearanbe between hub and the counter flange and sequentially laterally removed therefrom. Moreover, the ring as well as the rims and the flange are provided with axially aligned bores which are annularly distributed adjacent the respective peripheries. The bores of the flange are threaded to receive bolts which releasably interconnect rims, ring and flange. Additional bores and bolts provide for releasable interconnection of the rims without bolting to the flange. The two rims are mutually locked against relative rotation by means of a jaw coupling of limited give the parts of which being sandwiched between the rims and collars and connected thereto by the same bolts which hold collar to collar and rim to rim.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross-section through a shaft coupling improved in accordance with the preferred embodiment of the present invention;

FIG. 2 is an axial front view of the two-part spacer ring, as used in the coupling shown in FIG. 1; and FIG. 3 shows a detail of the spacer ring.

Proceeding now to the detailed description of the drawing, a general layout of the highly elastic shaft coupling shown in the figures will be described first. The coupling is basically comprised of a hollow shaft part or hub 1 to be connected to a rotating shaft, 1b, (driving input or driven output). The annular elements are denoted respectively by numerals 2 and 3 and are secured to hollow shaft or hub 1 by means of screws 12 to prevent relative rotation. Parts 2 and 3 are connected to a flange 7 which is provided with apertures 7a for bolting to a counter flange, 17, that pertains to the respective other rotating element, which is a driven output or driving input as the case may be.

Turning more to the details, annular element 3 is comprised of an inner collar 14, an outer rim 16 circumscribing collar 14, and an elastic or resilient annulus 15, e.g., of rubber. Annulus 15 is connected securely to rim 16 as well as to collar 14. Analogously element 2 has a collar 24, a circumscribing rim 26, and a resilient annular 25 is interposed between rim and collar.

The elements 2 and 3 are particularly secured to hub 1 by bolting the respective collar to each other and to a flange 1a on hub 1. Collar 14 has threaded bores for threadedly receiving the respective ends of bolts 12 whose respective heads bear against the flange 1a.

The two annular elements 2 and 3 are mutually locked as to relative rotation by means of a jaw coupling having an inner locking ring 4 with peripheral teeth which engage corresponding teeth of an outer ring 5. The inner ring 4 is secured by the same bolts 12 to the inner collars 14 and 24. The outer locking ring 5 is sandwiched between and connected to the outer rims 16 and 26 of the elements 2 and 3. The interlocking teeth of rings 4 and 5 permit some clearance and limited turning so that the coupling is not a rigid one, but there is a certain give corresponding to the resilience of annuli 15 and 25 which permit some rotation between the collars and the rims.

Outer ring 5 is provided with plural axial bores which are axially aligned with axial bores in rims 16 and 26. These bores are not threaded, but there is provided a corresponding plurality of bores in flange 7 which are threaded, and bolts 10 are threaded into these latter bores, while the heads of these bolts bear against one axial end face of rim 26. This way collars 16 and 26 as well as ring 5 and flange 7 are bolted together.

A biparted spacer ring 6 is interposed between rim 16 and flange 7. The assembly of ring 6 can be seen best from FIG. 2. The two parts or segments of the spacer ring are denoted 6a and 6b and are secured to each other by means of screws 13, (FIG. 3).

As can be seen from FIG. 1, elements 16, 5 and 26 may additionally be bolted together; the rim 16 for example is provided with a few threaded bores. In other words and for example the periphery of the rims are bolted together at two or three locations, using bolts such as 11 to merely interconnect elements 26 – 5 – 16, independently from the connection of these parts to spacer ring 6 and flange 7.

The flange 7 is constructed as an annulus with a wide central aperture. It can be seen that the outer diameter of collar 14 is smaller than the inner diameter of ring shaped flange 7. The axial dimensions of rims 16, 26 are considerably smaller than the axial length of collars 14 and 24, so that some axial clearance space remains for the spacer ring 6, while the collar 14 projects somewhat into the central opening of flange ring 7.

The distance Y of axial end face 8 of hub 1 from the outer axial end face 9 of flange 7 is somewhat larger than the axial dimension X of either ring 14 and 24. Face 9 lies in the interfacing plane between flanges 7 and 17.

In order to disassemble the coupling, bolts 10 (not 11!) and screws 13 are unscrewed at first. This permits axial displacement (to the left) of still interconnected elements 16 – 5 – 26, due to the resiliency of elements 15 and 25. The axial displacement need not be large, just enough to permit radial removal of the two disconnected spacer parts 6a and 6b. It should be noted that the operation thus far did not require disconnection of either part 1 or 7 respectively from shaft 16 and flange 17.

Next, flange 7 is inbolted from counter flange 17, and bolts 11 and 12 are unthreaded and removed. Upon shifting element 3 axially slightly to the right in FIG. 1, collar 14 will clear the edge of the end face 8 of hub 1 but without abutting the flange 17! Elements 3 and 7 can now be removed laterally, i.e. radially in any direction. Thereafter, elements 4 and 5, and later element 2 can be shifted into the axial clearance space between counter flange 17 and hub 1 and can be removed radially.

Reassembly is carried out analogously just in the reverse order. It can readily be seen that neither removal of hub 1 from shaft 1b nor any displacement of that shaft, nor displacement of counter flange 17 and its shaft is necessary for assembling and disassembling the coupling.

The invention is not limited to the embodiments described above but all changes and modifications thereof not constituting departures from the spirit and scope of the invention are intended to be included.

We claim:

1. Resilient shaft coupling including a hub for connection to a first rotating part, a flange element for connection to a second rotating part, and a pair of resiliently acting annular elements for connecting the hub to the flange element, each annular element of the pair including a collar, a rim circumscribing the collar and a resilient annulus interconnecting the rim and the collar, and wherein the one axial end face of the hub and the flange element define axial clearance larger than the largest axial dimension of each of the elements of the pair, the improvement comprising in combination;

a two-part spacer ring interposed between the rim of a first one of the annular elements of the pair and the flange element;

means for releasably connecting the collars of the elements of the pair to the hub; and means for releasably connecting the rims of the pair to each other and to the flange element with interpositioning of the spacer ring between the first element of the pair and the flange element.

2. Coupling as in claim 1, wherein the axial length of each collar is larger than the axial length of the respective rim, the flange element being an annulus having inner diameter larger than the outer diameter of the collars, the axial length of the collars being slightly smaller than the distance from the said hub end face and a plane through the axial face of the flange element facing away from the hub end face.

3. Coupling as in claim 1, said rims, said spacer ring and said flange each having a plurality of axial, axially aligned bores, the bores in the flange being threaded, the means for connecting the rims including bolts traversing the bores and being threaded into the threaded bores of the flange.

4. Coupling as in claim 1, there being additional bores in the rims and additional bolts for bolting the two rims to each other.

5. Coupling as in claim 1 including two jaw coupler rings respectively connected to the rims and the collars for inhibiting rotation between the elements of the pair beyond a tolerance range.

6. Coupling as in claim 1, the two parts of the spacer ring being releasably interconnected.

* * * * *